US006574734B1

United States Patent
Colson et al.

(10) Patent No.: US 6,574,734 B1
(45) Date of Patent: Jun. 3, 2003

(54) METHOD AND APPARATUS FOR SECURING ACCESS TO AUTOMOTIVE DEVICES AND SOFTWARE SERVICES

(75) Inventors: James Campbell Colson, Austin, TX (US); Stephen Glen Graham, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/221,889

(22) Filed: Dec. 28, 1998

(51) Int. Cl.[7] .................. G06F 11/30; G06F 17/00; G06F 9/00; G05D 1/00; H04L 9/00
(52) U.S. Cl. .............. 713/200; 701/1; 701/2; 701/32; 701/36; 709/1; 709/100; 713/166; 713/172
(58) Field of Search ................. 713/200, 166, 713/172, 182, 185, 202; 701/1, 2, 32, 36; 340/5.6, 5.21, 5.74, 5.8, 5.81, 5.82, 5.83, 5.84, 5.85; 705/59; 707/100, 101, 103; 709/1, 100

(56) References Cited

U.S. PATENT DOCUMENTS 6,185,491 B1 * 2/2001 Gray et al.
6,271,745 B1 * 8/2001 Anzai et al.

* cited by examiner

Primary Examiner—Gail Hayes
Assistant Examiner—Jenise Jackson
(74) Attorney, Agent, or Firm—Gregory M. Doudnikoff; Carstens, Yee & Cahoon, LLP

(57) ABSTRACT

A method and apparatus in a computing platform located in an vehicle for restricting access to a plurality of software components, wherein the plurality of software components are used to interface with a plurality of devices located within the vehicle. A request is received from an application for a software component, wherein the request includes a data structure, wherein the software component is a requested software component. A determination is made as to whether the requested software component is present within the plurality of software components. An access level for the application is identified and a result is returned to the application based on whether the requested software component is present in the plurality of software components and based on the access level identified for the application.

29 Claims, 7 Drawing Sheets

FIG. 7A

| User Profile name | Authorization level | |
|---|---|---|
| Driver | 6 | 704 |
| Owner | 5 | 706 |
| Third party mechanic | 4 | 708 |
| Dealer | 3 | 710 |
| Manufacturer | 2 | 712 |
| Designer | 1 | 714 |

FIG. 7B

| Component name | Authorization level | |
|---|---|---|
| Stereo component | 6 | 716 |
| Fuel gauge component | 6 | 718 |
| Fuel injection component | 4 | 720 |
| Power seat component | 6 | 722 |
| Standard engine diagnostic component | 4 | 724 |
| GPS navigation component | 5 | 726 |
| Proprietary engine diagnostic component | 1 | 728 |

FIG. 7C

| Component type | Authorization level | Object | |
|---|---|---|---|
| Engine diagnostic | 6 | Null | 732 |
| Engine diagnostic | 5 | Null | 734 |
| Engine diagnostic | 4 | Object 1 | 736 |
| Engine diagnostic | 3 | Object 2 | 738 |
| Engine diagnostic | 2 | Object 3 | 740 |
| Engine diagnostic | 1 | Object 4 | 742 |

METHOD AND APPARATUS FOR SECURING ACCESS TO AUTOMOTIVE DEVICES AND SOFTWARE SERVICES

BACKGROUND OF THE INVENTION

1. Technical Field

The present invention relates generally to an improved data processing system and in particular to a computer system within an automobile. Still more particularly, the present invention provides a method, system, and computer-readable code for selectively providing access to devices and software services in an automobile.

2. Description of the Related Art

Historically, computer programs were constructed from lower level hardware and software services by tightly coupling these parts together into a single executable image. This approach produced a computing environment that was inflexible and very resistant to predictable modification and adaptation to changing requirements. Applications written to these environments were very difficult to adapt to other computing environments. There was little opportunity to reuse application software to solve the same problem on a different computing environment.

More recently, computing architectures have incorporated a component approach. In these computing architectures, the base platform is composed by lower level components in an architecturally consistent fashion. This approach yields a more modular approach to software platforms, which allow any component to be replaced by another component, which achieves the same task. What allows this exchangeability of components is the standardization of software interfaces. A component is built to support one or more interfaces and provides these services to the computing platform. Any other component, which also implements those interfaces, can be used as a replacement.

Several examples of component architectures appear in the current art. These examples include the ActiveX architecture produced by Microsoft and the JavaBeans component model for Java produced by Sun Microsystems.

Computers have been on board automobiles since the late 1970s. Today, a typical vehicle contains anywhere from 5 to 12 microprocessors, while luxury cars have as many as 50. These processors range from 8 bit microcontrollers to 32 bit general purpose processors. The software programs that control power-train, chassis, integrated-body, and entertainment functions can contain more than 500,000 lines of code. The operating systems, language, libraries and techniques to implement the plethora of programs are quite varied with few consistent design methodologies. Historically, very few of these systems have communicated with each other.

As the complexities of vehicle software evolve and semiconductor technology advances, the electronics and software becomes even more sophisticated. Modern vehicular electronics systems now include bus architectures that allow some inter-ECU (electronic control unit) communication. Tomorrow's vehicular computing environment will further extend this trend to allow ECUs to collaborate and participate in a large variety of applications. These applications, including off vehicle communications, will continue to evolve as wireless communications technology becomes more pervasive.

Software as an increasing cost component of the vehicle is symptomatic of this evolution. This trend is expected to accelerate, causing software to become a significant time-to-market inhibitor.

Personal Computer (PC) platforms have standard, predictable configurations of hardware and software services. This configuration includes: CPU, memory, keyboard, mouse, monitor, serial port, and a small number of standard bus architectures, which attach external devices to the computing platform on the PC.

Programs written for the Personal Computer assume that this standard configuration is available and frequently fail to function properly if this assumption is violated.

Automotive embedded computing differs from PC and other Pervasive Computing situations because an automobile is a federation of connected devices as opposed to a single fit for purpose device like a smart pager or cellular telephone, or a reliable configuration of devices as is defined by the defacto standard PC.

Applications need access to functionality conveyed by devices on the automobile, either to poll their current status, as in the case of a fuel gauge, or manipulate the device, as in the case of radio station presets on a radio application. Because the population of devices can vary by individual automobile based on dealer and aftermarket device add-ons, the applications cannot rely on a fixed, standard population of devices. As a result, applications need to be written in a manner that is independent of device implementation and device configuration. When applications are written to standard APIs, independent of implementation details, they are more portable across car models and option/aftermarket add-on device populations. In addition, they are simpler because applications tend not to be littered with low level device-dependent implementation details.

In addition, applications need to be constructed in a manner in which access to device and software service functionality is done through an industry standard application programming interface (API) and not through details specific to one particular implementation of the device or software service. This allows applications to run with little or no modification on a greater variety of device configurations and automotive computing platform environments. This also allows applications to be added to the automotive computing platform throughout the life of the automobile, in particular, it enables third party software developers to construct applications to run on the automobile's computing platform.

AutoPC is an API set developed by Microsoft Corporation, which extends the WinCE operating system into the automotive industry. The WinCE operating system is an operating system available from Microsoft Corporation. AutoPC, however, uses the classic procedural approach of providing a set of data structures and function APIs to manipulate them.

With respect to securing access to various devices in an automobile, certain device functionality on the automobile (such as reading current oil pressure) may be benign and has little security issues. Other device functionality such as adjusting power seats, unlocking car doors, current GPS data, or manufacturer proprietary engine diagnostics data do have requirements for restricted access. Access to these devices or software services is important for certain applications, but uncontrolled access to these devices by any user over the internet (or directly connected) poses a security risk. As the automotive industry is concerned about the safety and security of their customers and in certain jurisdictions, mandated by law to do so, secure access to on-board device functionality is a requirement of automotive network computing.

Therefore, it would be advantageous to have a method and apparatus to selectively provide access to devices and software components through an automotive computing platform.

SUMMARY OF THE INVENTION

The present invention provides a method in a computing platform located in an vehicle for restricting access to a plurality of software components, wherein the plurality of software components are used to interface with a plurality of devices located within the vehicle. A request is received from an application for a software component, wherein the request includes a data structure and the software component is a requested software component. A determination is made as to whether the requested software component is present within the plurality of software components. An access level for the application is identified and a result is returned to the application based on whether the requested software component is present in the plurality of software components and based on the access level identified for the application.

The request made by the application may be for a type of software component. In this instance, a number of components may fall within the type of software components. Each of these components may provide a different level or amount of functionality. The actual component returned to the application may be based on the access level identified for the application. A higher access level may result in a component within the type of software component being returned to the application that has a higher level of functionality than would be returned if the application had a lower access level.

Other objectives and advantages of the present invention will be set forth, in part, in the description and in the drawings, which follow, and will be obvious from the description or may be learned by practice of the invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 7A and 7B are tables illustrating entries in databases contained within a registry in accordance with a preferred embodiment of the present invention;

FIG. 7C is a table containing multiple objects for an object or component type illustrated in accordance with a preferred embodiment of the present invention;

DESCRIPTION OF THE PREFERRED EMBODIMENT

Figure 1:
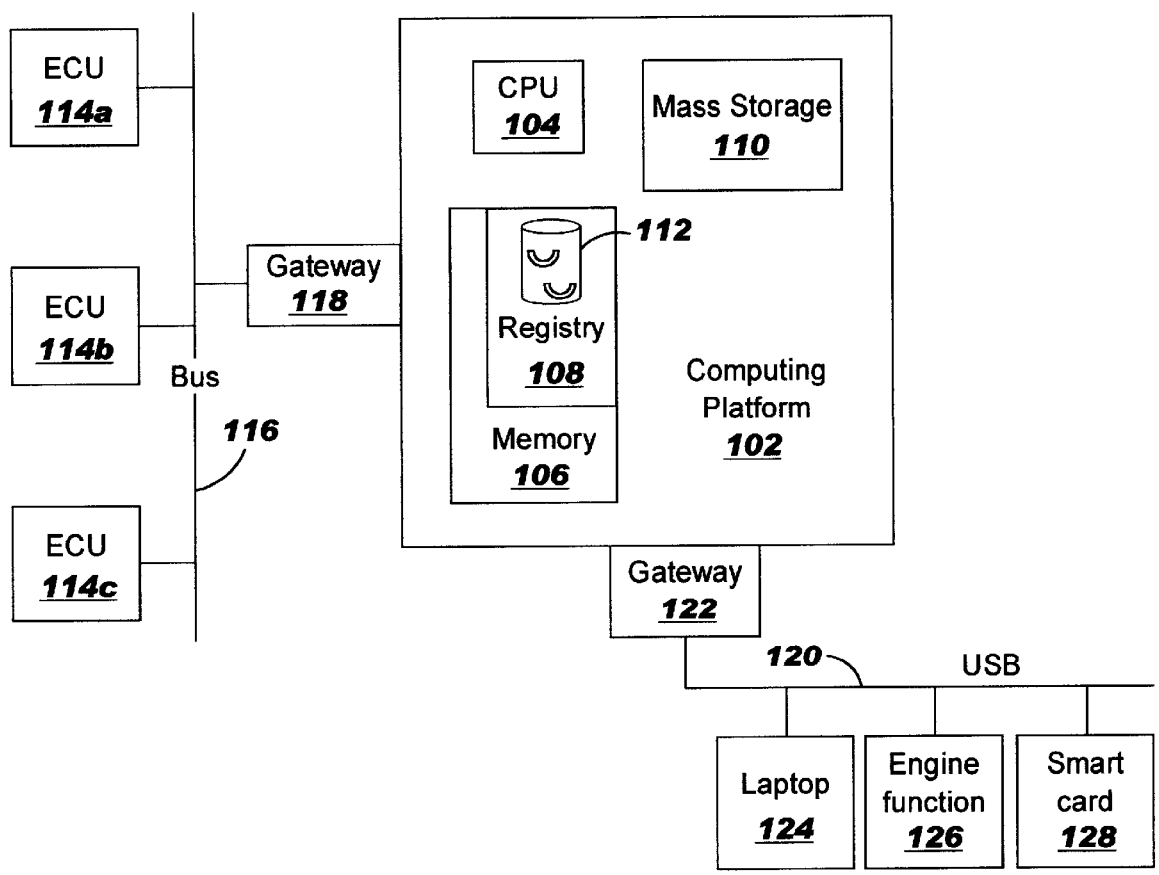
FIG. 1 is a block diagram showing a typical computing environment on an automobile in which the present invention may be practiced.

The present invention provides a solution to integrating and providing communication between applications and devices in a vehicle that has impact on Java-based automotive computing at several points in the software systems development life-cycle: 1) device and software services component development, 2) application development, 3) system configuration time, and 4) system run-time.

The present invention provides a method, apparatus, and instructions for use in an automotive computing platform. Standard Java APIs for the devices and software services are available on the computing platform in accordance with a preferred embodiment of the present invention. These implementations are in the form of JavaBeans. The present invention provides a method, apparatus, and instructions for selectively providing access to the hardware and software components of an automotive computing platform. In the depicted example, the hardware and software components are represented using the JavaBeans component model for Java. A registry mechanism is present, which provides naming and directory services for the software components. Applications executing on the computing platform use the registry mechanism to determine the existence of devices and other system software services. In the depicted example, the registry mechanism includes an authorization level that is associated with each of the software components within the registry mechanism. When an authorization level does not allow access to a software component, a response is returned to the software application that the component is not present or that the component is present, but authority to view or access the component is absent. In addition, multiple versions of a software component may exist that match a request from an application. These versions of the components may implement different functions or provide different levels of functionality. The actual version of a software component that is returned to the application would depend on the authorization level. For example, one authorization level may result in a version of a software component providing fifty percent of the functionality for the component while another authorization level may return a version that is one hundred percent functional. These components are all of the same type will represent the same interface, but have varying levels of completeness of functionality. In the depiced examples, authorization is based on a certificate used to map the requesting agent to a user profile stored in the registry. This user profile includes an authorization level for a particular user.

Devices that are to interact with a computing platform employ a standard application programming interface (API). An API is applied to all of the devices, which appear in a vehicle, such as an automobile. In addition, the mechanism or electronic means of querying or manipulating the device is present. In the depicted example, these device standard APIs are defined in terms of Java interface definitions.

The standard component model in Java is the JavaBeans component model. A JavaBean has two parts. The first part is the 'public face' the commitment to implement a standard Java interface representing an automotive device or software service. This defines a type in the Java language with which JavaBean is compatible. The second part is a web of collaborating Java instances that fulfill the interface implementation commitment. This web of instances collaborate to complete the bus and device specific implementation details in order that the semantics of the Java interface definition are properly implemented.

Software services such as a network stack for off vehicle data communications, or a sound output service utilizing the car's speakers are also representable as JavaBeans.

JavaBeans offer a superior approach to representing automotive devices and software services to Java applications for several reasons. First, a component model approach offers an efficient mechanism for applications to cope with the variety of devices and services, which may exist on an automobile. In addition, the configuration of an automobile's devices and services may be done either dynamically or statically through JavaBean serialization. Static configuration is more memory space efficient and cost efficient.

Further, a JavaBean can represent as a unit, a collaborating web of Java instances which proxy the device or convey the service. This allows the device interface implementation to be made out of a collaborating set of objects, some of which are reused for other device implementations. For example, a gateway object that encapsulates access mechanisms to an automotive bus can provide service to the device JavaBean proxies for each device on that bus. Also, applications can be composed of lower-level component building blocks. This composition is done in an implementation independent fashion, offering more portability of applications.

Componentization with JavaBeans offers a higher degree of flexibility when packaging applications and system configurations.

In the depicted examples, a registry is employed to provide applications access to the various JavaBean components. In addition, the registry is augmented with an ability to index the registry entry with a set of objects, keyed by an authorization level. In particular, a lookup mechanism is used to access the registry in which the lookup mechanism includes as a parameter, the authorization certificate of the requesting application.

When the registry lookup is made (either well known name, or interface-based) the authorization level is compared with the set of entries indexed by authorization. In the depicted example, the authorization is based on an x509 certificate, used to map the requesting agent to a user profile stored in the registry. User profiles could include: owner, driver, content provider, ISP, dealer, third party mechanic, manufacturer, other, etc. The object returned depends on matching the given authorization level with one of the collection of components within the directory entry. In the depicted example, if a match between the authorization level of a component and the authorization level of a user is absent, the user is not allowed access to this particular component. The user is told that the particular component is absent from the vehicle.

With reference now to the figures and in particular with reference to FIG. 1, a block diagram of an automotive computing platform in an automobile is depicted in accordance with a preferred embodiment of the present invention. The automobile 100 shown in FIG. 1 includes a computing platform 102, which contains a central processing unit (CPU) 104 and a computer memory 106. CPU 104 is an embedded processor in this example, but may be implemented using other processors, such as, for example, a Pentium Processor from Intel Corporation. "Pentium" is a trademark of Intel Corporation. Memory 106, in this example, may be in the form of read only memory (ROM), random access memory (RAM), non-volatile RAM and/or flash memory.

Computing platform 102 also hosts a component registry 108. Optionally, a mass storage device 110 may be found in automotive platform 100. Component registry may be stored on mass storage 110 or may be located in both memory 106 and mass storage 110. Mass storage device may be, for example, a hard disk drive or a CD-ROM drive. Software components 112, configured with the computing platform 102, are stored in component registry 108. Software applications may also be stored in component registry 108.

Devices such as sensors from the engine compartment, power door locks in the cabin, or the current fuel level sensor in the fuel tank of automobile 100 are embodied as electronic control units (ECUs) 114a–114c. ECUs 114a–114c also may be in the form of electronic equipment, such as a stereo system or mobile phone installed in automobile 100.

These ECUs may be connected via one or more data communications buses 116 of various architectures within automobile 100. The automotive industry uses different bus architectures than are common in the computing industry. Example automotive bus architectures that may be used within an automobile include architectures such as Controller Area Network (CAN), J1850; Intelligent Transportation System Data Bus (IDB); MultiMedia Link (MML), and MOST.

CAN is a protocol that was developed in Europe for passenger cars and is internationally standardized under ISO 11898. J1850 is a Society of Automotive Engineers (SAE) standard developed by various automotive manufacturers. IDB is defined by SAE and is a serial communications bus that creates an open, nonproprietary standard architecture to allow multiple electronic devices to be installed easily, cost effectively, and safely in any vehicle. MML is a bus architecture developed by Delco/Delphi. Lower speed bus architectures are often used to network ECUs in the engine compartments, the chassis and the cabin. Higher speed bus architectures are used to stream multimedia data between entertainment devices in the car such as between the radio and the in-cabin speakers. Each type of bus defines the format of the message protocols that determine the mechanism by which devices connected to the bus may communicate.

Computing platform 102 is connected to one or more of the automotive buses or discrete points of input/output (I/O) through an electronic connection of some means. This connection is known as a gateway 118. Gateway 118 is a combination of hardware and software, providing a mechanism by which the components and applications, running on the automotive computing platform, may communicate with the ECUs 114a–114b.

Computing platform 102 may also support other bus architectures more commonly found in the computing industry. Connections such as serial connections or Universal Serial Bus (USB) 120 may be used. The gateway 122 provides similar mechanism as described for gateway 118 to bus 116. Connected devices such as a laptop computer 124 or an engine function diagnostic console 126 may be connected to the computing platform 102 using this type of gateway. In addition, a smart card device 128 may be attached to USB 120 for use in logging on a driver or user of the vehicle. Depending on the implementation, a driver or user of a vehicle may be required to log in to use the vehicle. In such an instance, some information may be located in a smart card, which is a device with a circuit board or other circuitry containing built in logic or firmware in which information, such as a certificate may be located. This smart card is typically a credit card sized device, but may be incorporated into an ignition key to form a smart key.

Although the depicted example in FIG. 1 illustrates a computing platform connected to components by buses, other types of connections may be employed. For example, discrete connections between computing platform 102 and the various components, such as ECU's 114a–114c may be employed in place of bus 116.

Figure 2:
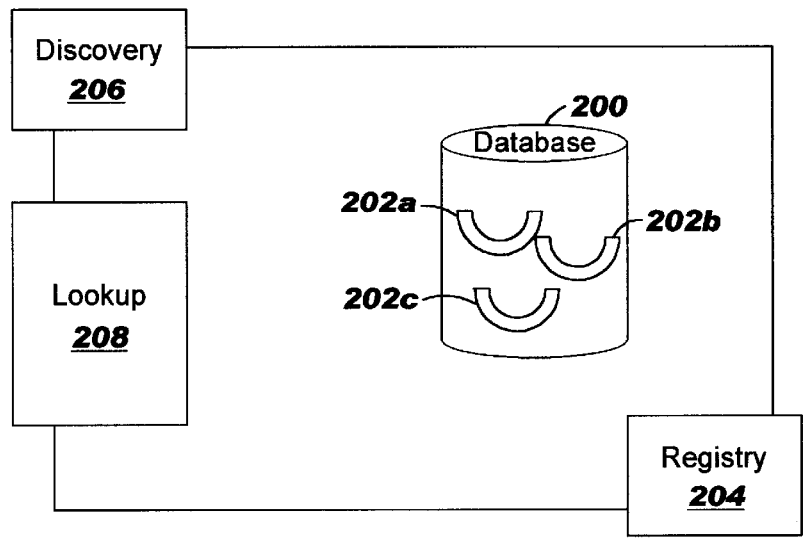
FIG. 2 is a block diagram representing the repository of program components found on the automobile computing platform.

With reference next to FIG. 2, a block diagram of parts of a component registry are depicted in accordance with a preferred embodiment of the present invention. In the figures, like reference numbers denote the same element throughout. Component registry 108 includes a component database 200 with components 202a–202c. Components 202a–202c found in database 200 may be, for example, without limitation, software representations of devices available on the automobile, software services (such as a data communications stack for off vehicle data communications) or applications.

Component registry 108 includes a registration mechanism 204 by which components can be inserted into, modified, and/or removed from the database. Component registry 108 also contains a discovery mechanism 206 by which applications can locate component registry 108. Discovery mechanism 206 can be implemented in a number of ways, such as, for example, as a broadcast mechanism on one or more of the bus architectures connected to the computing platform. Alternatively, discovery mechanism 206 may be embodied by a well-known memory address published in the architectural specifications of the computing platform, or it can also be embodied by a well-known name in the data communications address space of the computing platform.

Component registry 108 also has a lookup mechanism 208 by which applications can query the contents of the component database 200 and gain reference to one or more of these components 202a–202c. Lookup mechanism 208 receives a query from an application specifying the kind of component that the application requires. The embodiment of this query can include any predicate of name/value pairs. This is known in the art as query-by-example. It can also be embodied by specifying the required component in terms of the required interfaces the component must support or implement. The mechanism of reference is the standard object reference model as conveyed by the Java programming model.

Figure 3:
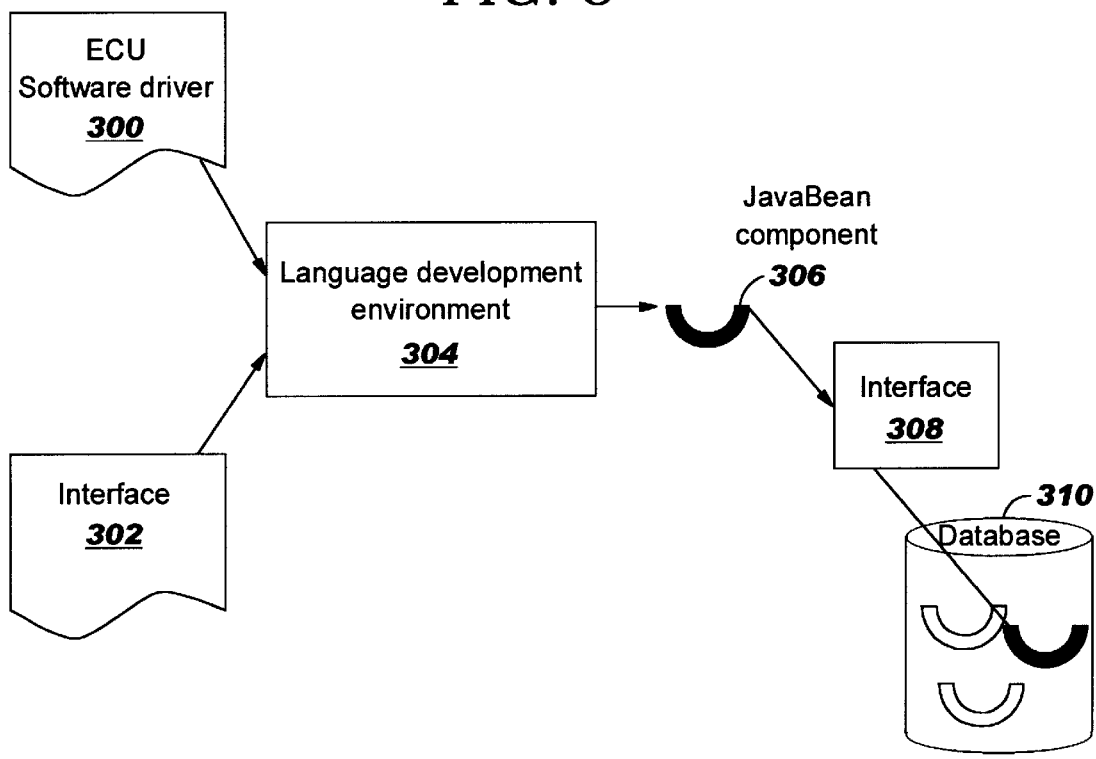
FIG. 3 illustrates how the automobile's complement of JavaBean components are constructed and registered into the repository.

Turning now to FIG. 3, a diagram illustrating a creation and registration of components with a registry in an automotive computing platform is shown in accordance with a preferred embodiment of the present invention. The process starts by the programmer understanding the details on the functionality conveyed by an ECU software driver 300, including the specification of the ECU's external application programming interface (API) and bus message protocols understood by ECU software driver 300. In other words, the programmer needs to understand the API that the software driver presents. The programmer also uses specifications of the mechanism by which that functionality can be accessed as well as the facilities made available by the corresponding gateway (i.e. gateway 118 in FIG. 1), which connects the computing platform to the ECU.

The programmer obtains specifications of any standard Java interface defined for the device. Java interfaces 302 are described in the form of textual specification or source code defining the Java interface itself. A Java programming language development environment 304 is used, for example, to define the JavaBean corresponding to a device or software service. Java programming language development environment 304 may be implemented using VisualAge for Java in accordance with a preferred embodiment of the present invention. VisualAge for Java is available from International Business Machines Corporation. In the case of a JavaBean representing an ECU, details of the ECUs API and message programming protocols are input to this process. Typically, the JavaBean is constructed using the Java Native Interface (JNI) to access low-level programming constructs such as sending messages on an automotive bus, usually implemented in a lower-level procedural programming language such as C. JNI is a standard programming interface for writing Java native methods and embedding the Java virtual machine into native applications. The primary goal of this interface is to provide binary compatibility of native method libraries across all Java virtual machine implementations on a given platform. These details may be completely embodied in the gateway to that bus, in which case the JavaBean need not have any native code. The JavaBean must implement the standard interface for that device if such a standard has been defined. These interface standards are input into the development environment.

The developer uses the development environment to create the set of classes that collaborate to form the JavaBean, create property sheets and/or customize objects to help systems integrators adapt the JavaBean to a particular automotive computing platform implementation.

The output of the development environment is a JavaBean component 306. The JavaBean component 306 is typically composed of one or more Java class files and is often conveyed in the form of a Java Archive (JAR) file. JavaBean component 306 is input to the automotive computing platform's component registry using the registry's registration mechanism 204 in FIG. 2. The registration mechanism uses interface 308 between itself and the database of components 310 to insert the JavaBean component into the database. JavaBean component 306 is now available for applications to use in order to access device functionality or software services on the platform.

It is obvious to those skilled in the art that this process of registration can occur at any time. Typically, many components will be registered with the automotive computing platform's registry during early development of the automobile's computing platform. However, these components also may be added to the registry well after the automobile is produced, shipped to the dealer and sold to the end-customer. By not restricting when component registration can be done, we support aftermarket addition of new devices to the automobile.

Figure 4:
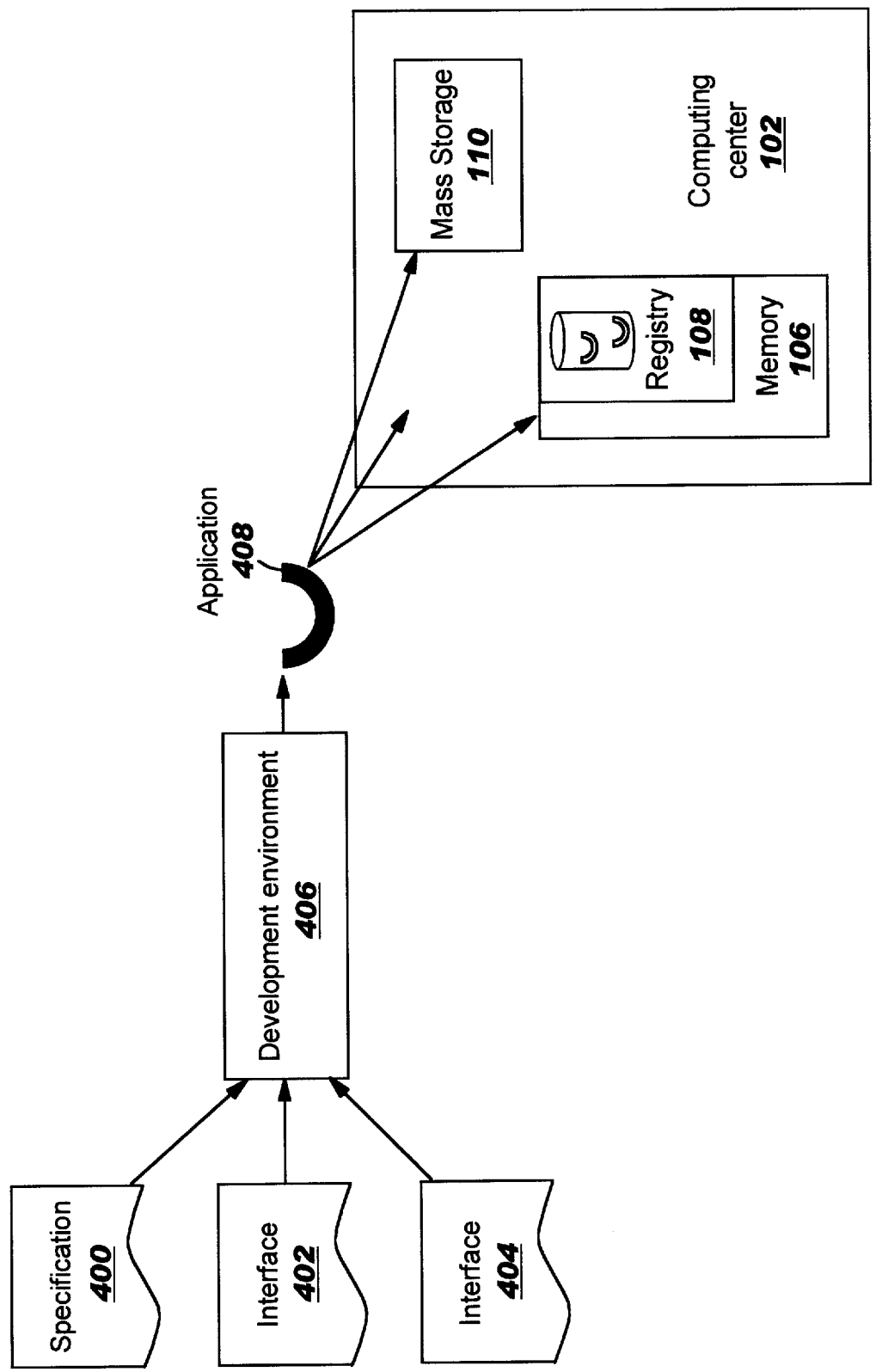
FIG. 4 illustrates how software applications are constructed using JavaBeans.

Turning next to FIG. 4, a diagram illustrates a process of how automotive software applications can be built using the component model described in this invention. The process begins with a specification 400, which is the intended functionality of the application. Specification 400 is usually embodied as a textual description, which may include use cases, scenarios, functional requirements and non-functional requirements. Also input to this process is a standard interface 402 of the automotive computing platform's component registry. In accordance with a preferred embodiment of the present invention, standard interface 402 is a Java interface, which describes the standard application programming interface to the component registry on any automotive computing platform. Also used as input are Java interfaces 404 to components on the automobile such as devices and/or software services. Java interfaces are preferably uniform or standard for all devices to which a computing platform is to interface in accordance with a preferred embodiment of the present invention.

The programmer uses a Java programming language development environment 400 such as IBM's VisualAge for Java. The programmer imports the definition for the component registry's interface as well as the standard interfaces to whichever device or software service components required by the application. The output of the development environment 406 is an application 408 in the form of a Java Application or Java Applet. The embodiment of this output can be a Java class file or a Java Archive (JAR) file.

Visual programming is an important productivity tool used in software development. Advanced automotive software development environments may also integrate a simulation environment to accelerate development and testing of automotive applications. A JavaBean representing a device could be programmed by the device manufacturer to include a graphical representation of the device suitable for the simulation environment. The application developer can use the JavaBean in a simulation environment to develop and test his/her application. These temporary graphical representations are stripped out by the packaging operation of the application.

Application 408 can be downloaded onto the automotive computing platform in a number of ways. Application 408 can be packaged with the platform itself, for example as an image stored in the platform's mass storage device 110 in computing center 102. This package mechanism may also place application 408 in a ROM in memory 106 using a tool, which converts Java application files into code, which can reside in ROM. The application may alternatively be installed as a component into component registry 108 using the registration mechanism available from the automotive computing platform's component registry as described earlier. Application 408 may also be loaded over the network as a Java applet in a dynamic and yet secure fashion.

It is obvious to those of ordinary skill in the art that application 408 can be added to the automotive computing platform at any time during the development process. An application can be developed as part of the automotive computing platform during manufacturing, added later as a component in the automotive computing platform's component registry or downloaded from the Internet using Javas' secure mechanism of class loading over a data communications network.

Figure 5:
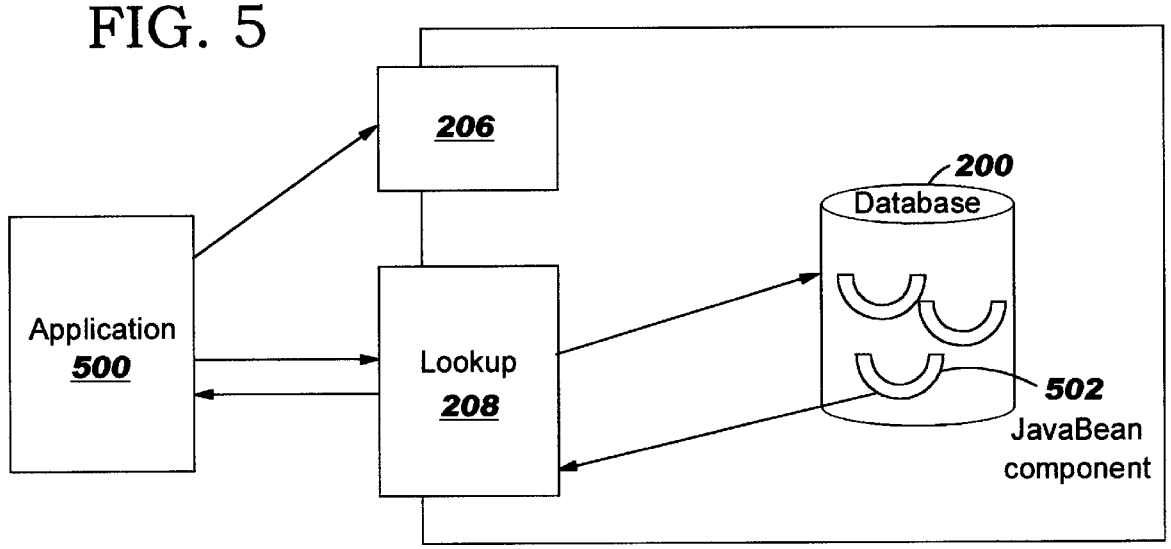
FIG. 5 illustrates how software applications discover the registry on the automobile's computing platform, query the registry for required JavaBean functionality, and gain reference to a JavaBean representing device functionality or software service.

Turning now to FIG. 5, a diagram illustrating the mechanism by which an application running on the automotive computing platform can access components representing devices and software service functionality is shown in accordance with a preferred embodiment of the present invention. An application 500, running on the automotive computing platform, can discover component registry 108 using the discovery mechanism 206 of component registry 108 as described previously. Once application 500 has a reference to component registry 108, application 500 can use lookup mechanism 208 to query the component database 200 to determine if the required functionality is conveyed by a component registered with the component registry 108. If such a component is available in the registry, lookup mechanism 208 returns to application 500, a reference to that component. In this example, the component may be JavaBean component 502. Once application 500 has a reference to JavaBean component 502, application 500 can access the device or software service functionality by invoking methods on JavaBean component 502, using the normal mechanism of Java method invocation.

In this manner, applications can be built to execute on a wide variety of device configurations found in automobiles today.

Figure 6:
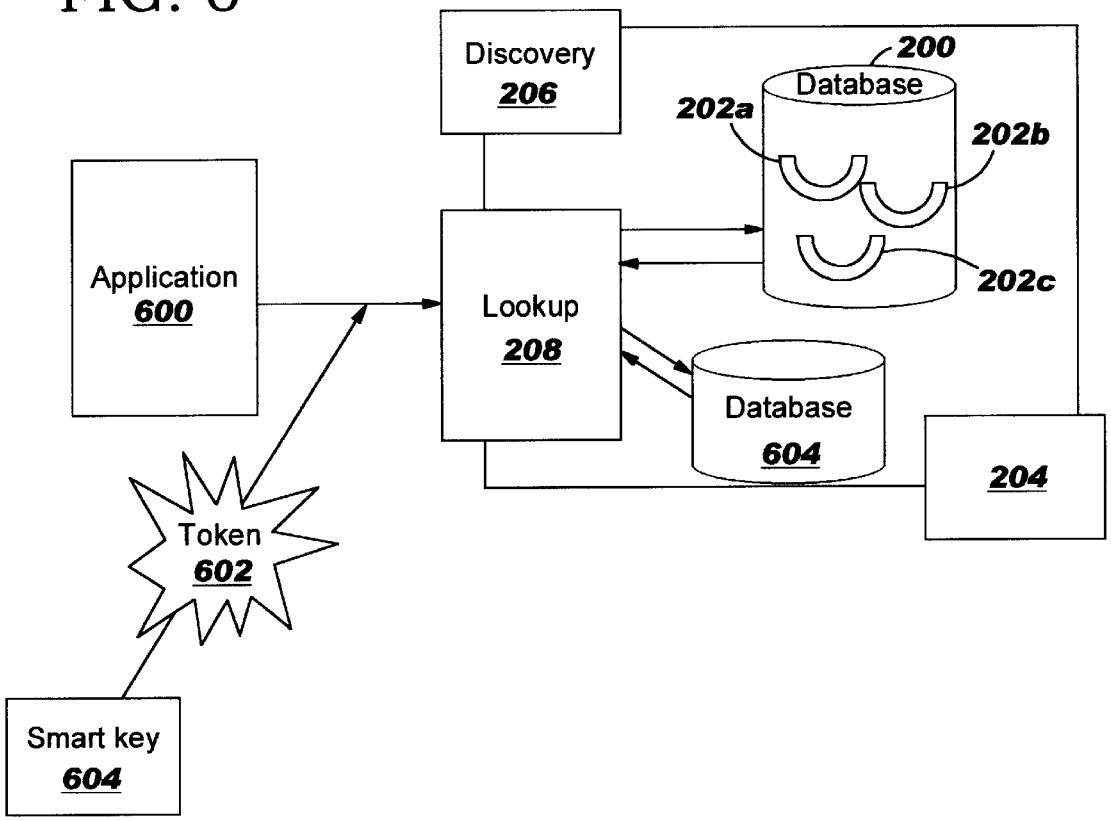
FIG. 6 is a diagram of the components in a registry used for component lookup controlled by a security mechanism in accordance with a preferred embodiment of the present invention.

Turning now to FIG. 6, a diagram of the components in a registry used for component lookup controlled by a security mechanism is depicted in accordance with a preferred embodiment of the present invention. An application 600, uses lookup mechanism 208 in registry 108 to request a component from database 200 that satisfies a particular set of properties (for example matches a well known name or implements a given Java Interface). Lookup mechanism 208 in registry 108 restricts access to components by requiring application 600 to supply an authentication token 602. In the depicted example, authentication may be achieved using an X509 certificate, which is a CCITT X series certificate. CCITT X series is a set of recommendations adopted by the International Telecommunications Union (ITU-T), formerly the CCITT, and ISO for standardizing equipment and protocols used in both public-access and private computer networks. A certificate is a file that identifies a person or organization. The certificate may encrypt information used to certify the identity of an owner of the certificate. In the depicted example, the certificate may be retrieved from a smart key 604, which contains the certificate.

Regardless of embodiment, the token can be retrieved from the automobile occupant in myriad ways. These include:

encoding an X509 certificate on the ignition key during dealer preparation of vehicle before delivery of customer; requiring the occupant to perform a system logon, including user ID and password and using this user ID/password combination as authentication;. and recording voice patterns associated with the occupant and recognizing the occupant based on voice recognition in response to a system greeting/ challenge issued by the automotive computing platform.

The registry has a database 604, which matches instances of the preferred embodiment of the authentication token (X509, voice recognition, user ID/password) into one or more user profile(s). In addition to unique password profiles, Standard user profiles may be associated with the automotive computing platform, which may include: guest, owner, driver, passenger, authorized mechanic, authorized dealership mechanic, authorized factory engineer. There may also be other user profiles that are specific to and are defined by system services or third party applications installed on the computing platform. Database 604 may be implemented in a number of ways, such as, for example, a X509 public key chain.

The lookup mechanism 208 matches the lookup request with all qualifying components found in the database of components 200.

In the depicted example, lookup mechanism 208 concurrently access database 604, containing user profiles, to establish a user profile associated with the lookup request, submitted by application 600. Based upon the user profile associated with authentication token 602 supplied by application 600, lookup mechanism 208 reduces the set of components matching the submitted request by filtering out those components that do not match the privileges associated with that user profile.

If any components that match the query request and the user profile are present, one of the components is returned to application 600. In the depicted example, if there is more than one component that satisfies the user profile's privileges and matches the lookup criteria, lookup mechanism 208 will return the component containing the most functionality. If there are no components that satisfy these restrictions, the value null is returned to application 600, indicating that no component is available. When a match is absent, the response of the registry can take a few forms. For example, the registry may raise an exception that the service is not available or may disable the device (in severe cases this may be the best response for an apparent attack, requiring the dealer or authorized administrator to "enable" the JavaBean again). Alternatively, the registry may leave the JavaBean intact, but increase the security required to access it (a defensive posture as well). Or, the registry may respond exactly the same as if there was no corresponding entry in the database; the application could not tell the difference between "device is not present" and "device is there, but you don't have authority to view it".

With reference now to FIGS. 7A and 7B, tables illustrating entries in databases contained within a registry are depicted in accordance with a preferred embodiment of the present invention. Table 700 in FIG. 7A is a table illustrating entries for user profiles in database 604 while table 702 in FIG. 7B illustrates entries for components in database 200. Each entry in table 702 includes a reference (not shown) to the component associated with the entry. This reference is a standard Java reference. In table 700, profile names are associated with authorization levels for use by lookup mechanism 208 to determine whether a component meeting the criteria in an application should be returned to the application. In the depicted example, entry 704 is a driver having an authorization level of 6, entry 706 is an owner having an authorization level of 5, entry 708 is a third party mechanic having an authorization level of 4, entry 710 is a dealer having an authorization level of 3, entry 712 is a manufacturer having an authorization level of 2, and entry 714 is a designer having an authorization level of 1. The profile for the driver in entry 704 may be unique for each driver of the vehicle.

In table 702, components are associated with authorization levels so that lookup mechanism 208 can determine whether to return a component to an application based on the authorization level of the user as defined in a user profile entry in table 700. In the depicted example, entry 716 includes a stereo component having an authorization level of 6, entry 718 is a fuel gauge component having an authorization level of 6, entry 720 is a fuel injection component having an authorization level of 4, entry 722 is a power seat component having an authorization level of 6, entry 724 is a standard engine diagnostics component having an authorization level of 4, entry 726 is a global positioning satellite (GPS) component having an authorization level 5, and entry 728 is a proprietary engine diagnostics component having an authorization level of 1. In this example, a match between a component and a user occurs if the authorization level of the user is equal to or less than the authorization level associated with the component.

Another mechanism that may be implemented would be to require an exact match with the component type and a request in which each component implementing that type is examined and has a list of access rights that may be compared to the authorization level of the user making the request. In such a case, a number of components are present for a component type in which each component may provide a different amount of functionality. For example, in FIG. 7C, a table 730 containing multiple objects for an object or component type is illustrated in accordance with a preferred embodiment of the present invention. Like table 700 and 702 in FIG. 7A and 7B, this table also may be located within a registry. In this example, entries 732–742 are all entries for a component type identified as engine diagnostic. Each entry contains an authorization level and an identification of an object representing the component in addition to the component type. In the depicted example, an application that requested an engine diagnostic would receive a result based on the authorization level. If the authorization level is 4 or less, the application would be returned one of the objects identified in entries 736–742. These objects in entries 736–742 may be different versions of the same component providing different amounts of functionality or access to different numbers of functions. Alternatively, they may provide entirely different functions.

If the authorization level for the application is 5 or 6, a null parameter is found in entries 732 and 734. In such an instance, the application would be returned a result indicating that no software component matched the request or alternatively, that access to the component is not allowed. If the authorization level is 2, object 3 in entry 740 would be returned to the application in response to a request for a component having a type identified as engine diagnostic component. In the depicted example, the best component or component having the highest level of functionality will be returned to the application in the event that the application is allowed to access more than one component based on the authorization level. For example, if the application is allowed to access two components in which one component has more functions or methods available, that component will be returned to the application.

Regardless the mechanism of lookup, there is a requirement that the functionality conveyed by the device or service JavaBean may have restricted levels of service depending on the authorization level associated with the request. For example, in engine diagnostics, the service providing this information may have three levels of authorization: owner, garage mechanic and manufacturer engineer. The engine diagnostic JavaBean associated with the owner level of authorization may not allow access at all. The engine diagnostic JavaBean associated with the garage mechanic may have all of the engine diagnostic API definition implemented, but nothing more. Finally, the JavaBean associated with the manufacturer engineer authorization level will have the entire standard engine diagnostic API, plus additional methods that access private, proprietary engine data.

Figure 8:
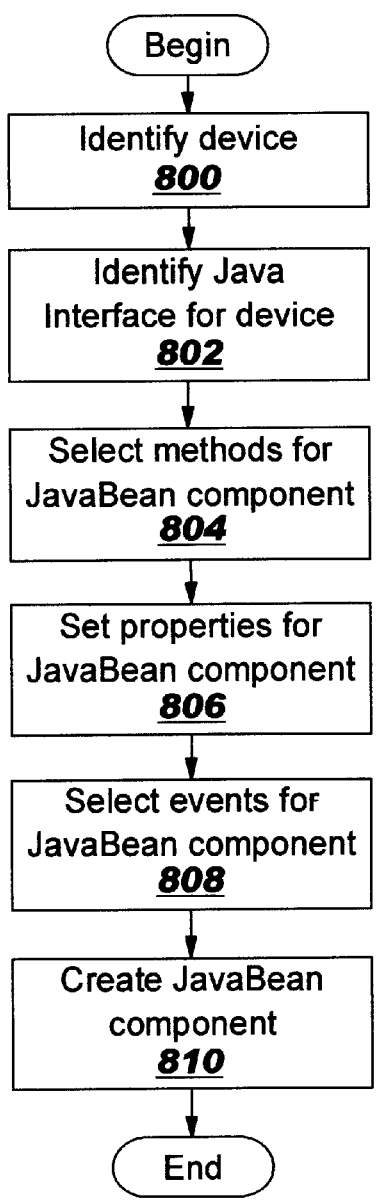
FIG. 8 is a flow chart of a process for creating a JavaBean component in accordance with a preferred embodiment of the present invention.

With reference now to FIG. 8, a flowchart of a process for creating a JavaBean component is depicted in accordance with a preferred embodiment of the present invention. Although the depicted example involves the creation of a JavaBean component for a device, this process is also applicable to the creation of a JavaBean component for a software service.

The process in FIG. 8 begins by identifying a device for which a JavaBean component is to be created (step 800). A Java interface is then identified for the device (step 802). In step 802, the interface by which the device communicates is identified. In most cases, it is preferable that the device employ a standard Java interface. If other interfaces are employed by the device, it is possible to create an interface for use with the JavaBean component through a JNI.

Methods are then selected for the JavaBean component based on the functionality of the device that the JavaBean component is to represent (step 804). A method in a JavaBean component is a normal Java method, which can be called from other components or from a scripting environment. Next, properties are set for the JavaBean component (step 806). Properties are named attributes associated with a bean that can be read or written by calling the appropriate methods on the bean. Then, events are selected for the JavaBean component (step 808). Events provide a way for one component to notify other components that something interesting has happened. These components may be other beans. Thereafter, the JavaBean component is created (step 810) with the process terminating thereafter.

Figure 9:
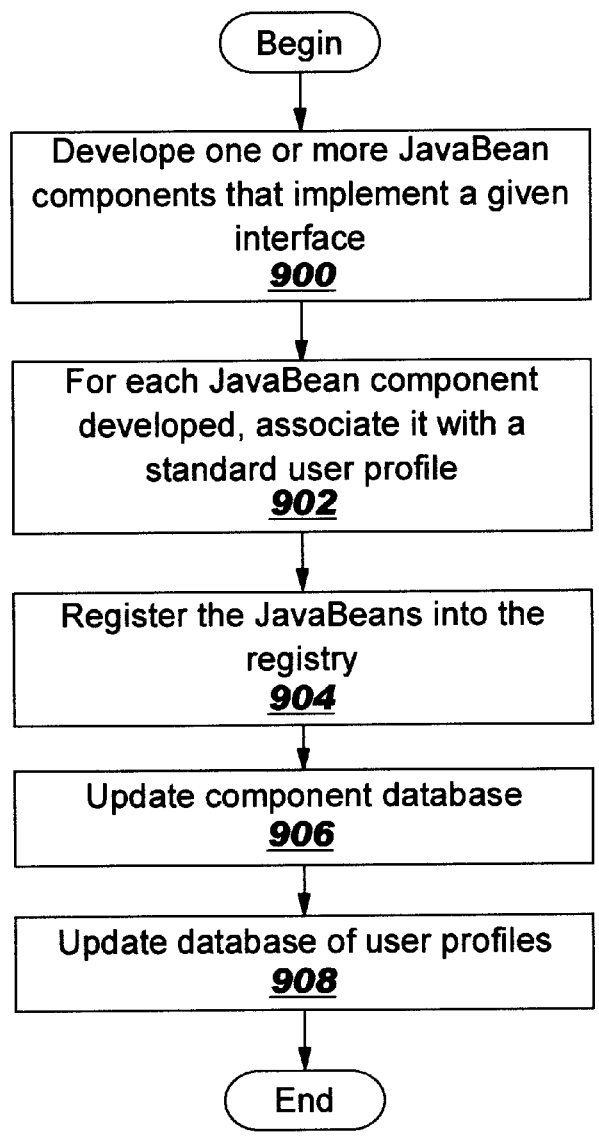
FIG. 9 is a flowchart of a process used in registering a set of JavaBean components and associated user profiles in accordance with a preferred embodiment of the present invention.

With reference now to FIG. 9, a flowchart of a process used in registering a set of JavaBean components and associated user profiles is depicted in accordance with a preferred embodiment of the present invention. For example, consider the case of a JavaBean representing the engine diagnostics from a car. The engine diagnostics JavaBean would be based on a standard engine diagnostics service interface defined in Java. For the sake of argument, let this interface define 12 methods.

The manufacturer of the engine diagnostics subsystem could define one or more JavaBeans components that implement a selected interface (step 900). Each JavaBean component, developed in step 900, implementing the standard engine diagnostics interface uses different mechanisms. Each JavaBean component is associated with a user profile (step 902). An association is made between a collection of user profiles and a device or software service JavaBean using a property of the JavaBean.

For example, the manufacturer decides to make one JavaBean implementation associated with the user profile "guest", one for user profile "owner", one for user profile "garage mechanic", and one for user profile "factory engineer". The implementation associated with the guest user profile implements all 12 methods of the interface to throw the exception "UnsupportedOperationException". The JavaBean associated with the "owner" user profile implements 6 of the methods using simple read only algorithms and throws "UnsupportedOperationException" for the other 6. The "garage mechanic" version has all but 2 of the methods implemented properly, with the final 2 methods, associated with proprietary, detailed engine diagnostic data throwing the "UnsupportedOperationException". Finally, the most complete implementation of the interface is associated with "factory engineer" and has a complete, detailed implementation of all 12 methods. Thus, a user may be allowed to view or access a component, but only access to certain features provided by a component depending on the authorization level of the user.

The set of JavaBeans is registered with the registry using the registry's registration mechanism (step 904). The registration mechanism registers each JavaBean component into the database of components (step 906). For each JavaBean in the set, the registry's registration mechanism interrogates the user profile property of the JavaBean and updates the database of user profiles (step 908) if there are any new user profiles defined by the JavaBean. Steps 906 and 908 are performed concurrently in the depicted example.

Figure 10:
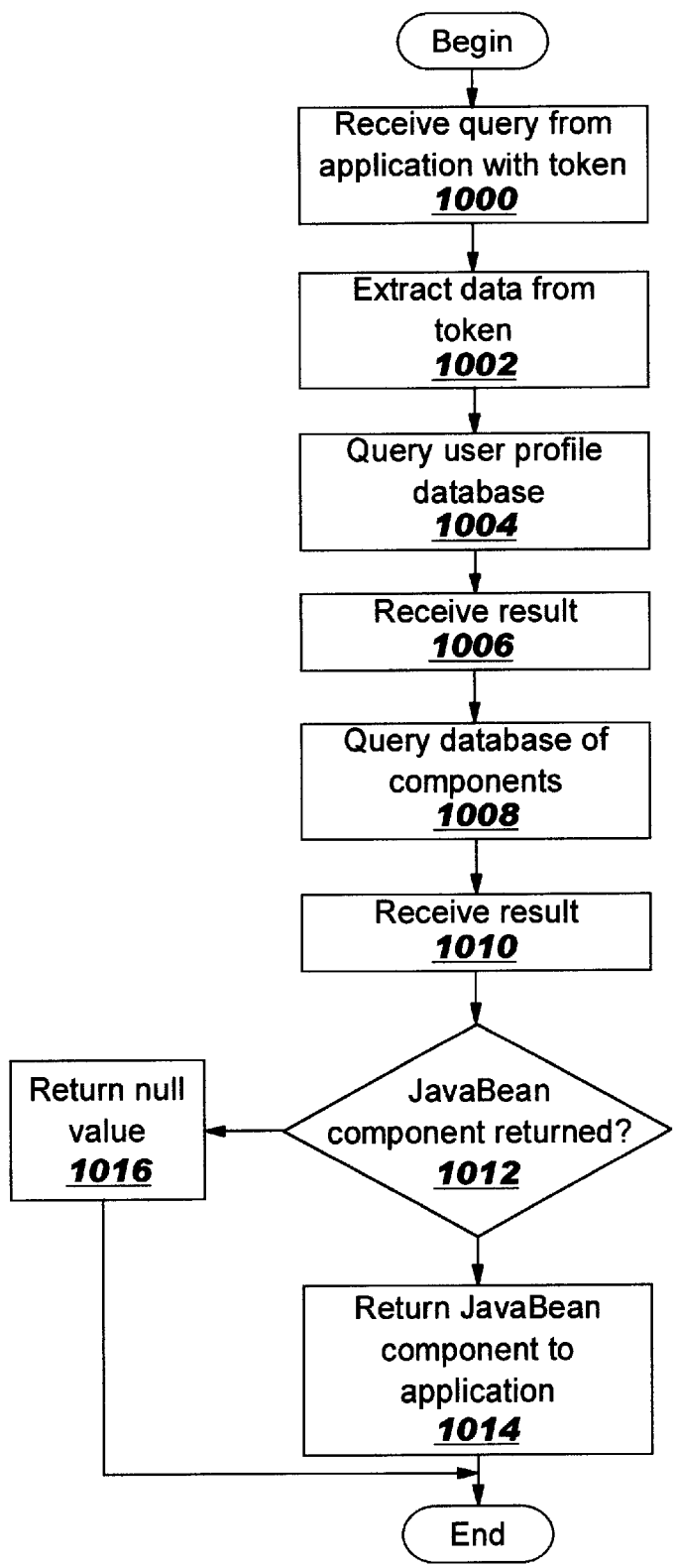
FIG. 10 is a flowchart of a process used in a lookup mechanism in a registry in accordance with a preferred embodiment of the present invention.

Turning now to FIG. 10, a flowchart of a process used in a lookup mechanism in a registry is depicted in accordance with a preferred embodiment of the present invention. An application uses the lookup mechanism of a registry to establish a reference to a JavaBean component implementing a required interface. When an application desires access to a device or service within a vehicle, the application will send a request to the lookup mechanism in a registry for the device or service. In response, a reference to a component matching the device or service will be returned to the application if the component is present within the registry and if the application is authorized to access the component.

The process begins by receiving a request for a device or service represented by a JavaBean component implementing a particular interface (step 1000). This request may be for a particular function or device. In the depicted example, an authentication token is received as part of the request.

Data is then extracted from the authentication token to perform authentication of the user for the requested JavaBean component (step 1002). This data extracted from the authentication token includes a user profile name. A database containing user profiles is queried using the information extracted from the authorization token (step 1004). A result is received from the database (step 1006). This result contains an authorization level, such as those illustrated in FIG. 7A. The database containing components also is queried (step 1008). Steps 1004 and 1008 are performed concurrently in the depicted example. A result is received from this query (step 1010). In this example, the result is one or more components matching the requested function or device.

After receiving the results from steps 1004 and 1008, a determination is then made as to whether the JavaBean component should be returned to the application (step 1012). This determination is made in the depicted example by comparing the authorization level for the user profile to the authorization level required for the JavaBean component. Based on the authorization levels illustrated in FIGS. 7A and 7B, a match occurs if the authorization level of the user is less than or equal to the authorization level associated with the JavaBean component. If the JavaBean component is to be returned to the application, a Java reference to the JavaBean component is sent to the application (step 1014) with the process terminating thereafter. If more than one component was returned in step 1010, the function or device having the most features may be returned, or alternatively, the device or function having the most recent revision data may be returned. Otherwise, if a JavaBean component is not to be returned to the application, a null value is returned (step 1016) with the process terminating thereafter. This value is used to indicate to the application that a JavaBean component corresponding to the requested device or service is absent in the registry.

Figure 11:
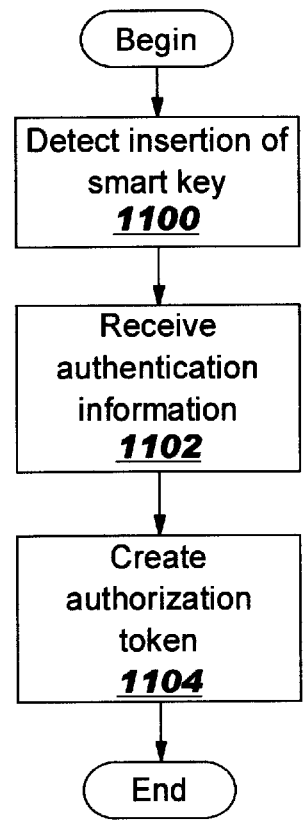
FIG. 11 is a flowchart of a process used to log on a user or driver of a vehicle in accordance with a preferred embodiment of the present invention.

With reference now to FIG. 11, a flowchart of a process used to log on a user or driver of a vehicle is depicted in accordance with a preferred embodiment of the present invention. The process begins by detecting insertion of a smart key in the ignition of the vehicle (step 1100). As described above, the smart key contains circuitry storing a certificate. The authentication information is received from the smart key (step 1102). An authorization token is then created from the certificate (step 1104) with the process terminating thereafter. Alternatively, a user may log on via a user name and password or through a voice recognition system with these inputs being used to create an authorization token.

Thus, the present invention provides a mechanism to deliver device functionality and software services to Java based applications in an efficient manner. The present invention uses JavaBean components in a computing platform on a vehicle that may have varying device population available and software services. This platform allows for applications to be able to find and access these devices.

As a result, the present invention provides a technique in which the functionality of devices and software services on an automobile can be designed as modular components of an automobile's computing platform. A technique is provided whereby an application for an automotive computing platform can be designed and constructed to discover and utilize the functionality available on an automotive computing platform through a software component model. The present invention provides these benefits through a mechanism by which device components use a standard API definition with applications are built to access device and software services based on these standard interfaces and not based on low-level details specific to the implementation of the device or software service particular of an automotive computing platform.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, although the depicted examples were directed towards an automobile, the process, apparatus, and instructions of the present invention may be applied towards other types of vehicles. For example, the present invention may be employed in an aircraft, such as airplanes or helicopters. In addition, the apparatus, processes, and instructions of the present invention may be applied to other programming systems other than Java. For example, the present invention may be applied to other bytecode based systems, such as Smalltalk. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a computing platform located in an vehicle for restricting access to a plurality of software components, wherein the plurality of software components are used to interface with a plurality of devices located within the vehicle, the method comprising:

receiving a request from an application for a type software component, wherein the request includes a data structure;

determining whether the a software component matching the software component type is present within the plurality of software components;

identifying an access level for the application; and returning a result to the application based whether the a software component matching the software component type is present in the plurality of software components and based on the access level identified for the application.

2. The method of claim 1, wherein a number of software components match the software component type in which each software component in the number of software components is associated with an access level and wherein the step of returning a result includes:

providing the application access to a software component with the number of software components the requested software component in response the application being allowed access to the software component.

3. The method of claim 2, wherein each of the number of components has a different level of functionality and is associated with a different access level in which a higher access level is associated with a software component within the number of software components having a higher level of functionality than a software component within the number of components having a lower level of functionality.

4. The method of claim 3, wherein a component from within the number of components returned by selecting a component within the number of components having a highest level of functionality that is also allowed to be accessed by the software component.

5. A car comprising:

a body;

a set of wheels attached to the body;

an engine located within the body, wherein the engine provides power to turn at least one wheel in the set of wheels to move the body;

a plurality of devices;

a bus, wherein the bus provides electrical connection to the plurality of devices;

a computing platform, wherein the computing platform is connected to the bus, the computing platform including:

a plurality of Java software components, wherein the each of the plurality of Java software components is used to access a device within the plurality of devices; and is associated with a authorization level;

a data structure containing a plurality of user profiles in which each profile within the plurality of user profiles is associated with an authorization level; and a registry mechanism, wherein the registry mechanism is used to provide access to the plurality of Java software components, wherein the registry mechanism has a plurality of modes of operation including:

a first mode of operation in which the registry mechanism monitors for a request for a software component;

a second mode of operation, responsive to receiving a request in the first mode of operation, in which the registry mechanism identifies an authorization level for the request; and a third mode of operation, for returning a result based on the identified authorization level.

6. A method in a computing platform located in an automobile for restricting access to a plurality of software components, wherein the plurality of software components are used to interface with a plurality of devices located within the automobile, the method comprising:

receiving a request from an application for a software component, wherein the request includes a data structure, wherein the software component is a requested software component;

determining whether the requested software component is present within the plurality of software components;

determining whether the application is allowed access to the requested software component based on the data structure; and providing the application access to the requested software component in response to the software component being present and in response the application being allowed access to the requested software component.

7. The method of claim 6, wherein the step of determining whether the requested software component is present within the plurality of software components is responsive a determination that the application is allowed access.

8. The method of claim 6, wherein the step of determining whether the application is allowed access to the requested software component based on the data structure is responsive to a determination that the requested software component is present.

9. The method of claim 6, wherein the request is for a function and wherein the determining whether the software component is present includes determining whether a software component is present providing the function requested by the application.

10. A method in a computing platform located in an vehicle for restricting access to a plurality of software components, wherein the plurality of software components are used to interface with a plurality of devices located within the vehicle, the method comprising:

receiving a request from an application for a software component, wherein the request includes a data structure, wherein the software component is a requested software component;

determining whether the requested software component is present within the plurality of software components;

identifying an access level for the application; and returning a result to the application based whether the requested software component is present in the plurality of software components and based on the access level identified for the application.

11. The method of claim 10, wherein the each software component is associated with an access level and wherein the step of returning a result includes:

providing the application access to the requested software component in response to the software component being present and in response the application being allowed access to the requested software component.

12. The method of claim 10, wherein the each software component is associated with an access level and wherein the result returned to the application indicates an absence of the software component in response to the software component being present and in response the application being denied access to the requested software component.

13. The method of claim 10 further comprising:

increasing and changing the authorization level for the software component in response to an unsuccessful request for the requested software component.

14. The method of claim 10, wherein the plurality of software components is a plurality of JavaBean components, wherein the each Java bean component within the plurality of JavaBean components represents a device within the vehicle.

15. The method of claim 10, wherein the plurality of software components is a plurality of JavaBean components, wherein the each Java bean component within the plurality of JavaBean components represents a software service within the vehicle.

16. The method of claim 10, wherein the vehicle is an automobile.

17. A data processing system located in an vehicle for restricting access to a plurality of software components, wherein the plurality of software components are used to interface with a plurality of devices located within the vehicle, the data processing system comprising:

receiving means for receiving a request from an application for a software component, wherein the request includes a data structure, wherein the software component is a requested software component;

determining means for determining whether the requested software component is present within the plurality of software components;

identifying means for identifying an access level for the application; and returning means for returning a result to the application based whether the requested software component is present in the plurality of software components and based on the access level identified for the application.

18. The data processing system of claim 17, wherein the each software component is associated with an access level and wherein returning a result includes:

providing means for providing the application access to the requested software component in response to the software component being present and in response the application being allowed access to the requested software component.

19. The data processing system of claim 17, wherein the each software component is associated with an access level and wherein the result returned to the application indicates an absence of the software component in response to the software component being present and in response the application being denied access to the requested software component.

20. The data processing system of claim 17 further comprising:

increasing means for increasing and changing the authorization level for the software component in response to an unsuccessful request for the requested software component.

21. The data processing system of claim 17, wherein the plurality of software components is a plurality of JavaBean components, wherein the each JavaBean component within the plurality of JavaBean components represents a device within the vehicle.

22. The data processing system of claim 17, wherein the plurality of software components is a plurality of JavaBean components, wherein the each JavaBean component within the plurality of JavaBean components represents a software service within the vehicle.

23. The data processing system of claim 17, wherein the vehicle is an automobile.

24. A data processing system located in an automobile for restricting access to a plurality of software components, wherein the plurality of software components are used to interface with a plurality of devices located within the automobile, the data processing system comprising:

receiving means for receiving a request from an application for a software component, wherein the request includes a data structure, wherein the software component is a requested software component;

first determining means for determining whether the requested software component is present within the plurality of software components;

second determining means for determining whether the application is allowed access to the requested software component based on the data structure; and providing means for providing the application access to the requested software component in response to the software component being present and in response the application being allowed access to the requested software component.

25. The data processing system of claim 24, wherein the first determining means is responsive to a determination that the application is allowed access.

26. The data processing system of claim 24, wherein the second determining means is responsive to a determination that the requested software component is present.

27. The data processing system of claim 24, wherein the request is for a function and wherein the first determining means includes means for determining whether a software component is present providing the function requested by the application.

28. A computer program product in a computer readable medium for use in an vehicle for restricting access to a plurality of software components, wherein the plurality of software components are used to interface with a plurality of devices located within the vehicle, the computer program product comprising:

first instructions for receiving a request from an application for a software component, wherein the request includes a data structure, wherein the software component is a requested software component;

second instructions for determining whether the requested software component is present within the plurality of software components;

third instructions for identifying an access level for the application; and fourth instructions for returning a result to the application based whether the requested software component is present in the plurality of software components and based on the access level identified for the application.

29. A computer program product in a computer readable medium for use in an automobile for restricting access to a plurality of software components, wherein the plurality of software components are used to interface with a plurality of devices located within the automobile, the computer program product comprising:

first instructions for receiving a request from an application for a software component, wherein the request includes a data structure, wherein the software component is a requested software component;

second instructions for determining whether the requested software component is present within the plurality of software components;

third instructions for determining whether the application is allowed access to the requested software component based on the data structure; and fourth instructions for providing the application access to the requested software component in response to the software component being present and in response the application being allowed access to the requested software component.

* * * * *